United States Patent Office 3,759,856
Patented Sept. 18, 1973

3,759,856
METAL HALIDE AND POLYGLYCERAL CARBOXYLIC ACID ESTER STABILIZERS FOR VINYL CHLORIDE POLYMERS
Philip H. Rhodes and Robert L. Ahr, Cincinnati, Ohio, assignors to Emery Industries, Inc., Cincinnati, Ohio
No Drawing. Filed May 30, 1972, Ser. No. 258,059
Int. Cl. C08f 45/56, 45/58
U.S. Cl. 260—23 XA                                         11 Claims

ABSTRACT OF THE DISCLOSURE

Liquid stabilizer compositions are provided which are useful with vinyl halide resins to impart improved antistatic and antifogging properties in addition to stabilizing the resins against the deleterious effects of oxygen, heat and light. The stabilizer solutions are obtained by mixing a Group II metal halide with a polyglycerol partial ester.

BACKGROUND OF THE INVENTION

Multicomponent stabilizer systems are used extensively with polyvinyl halide resins. Such stabilizer packages are required due to the inability of any one material to sufficiently protect the resins against oxidative, thermal and photochemical degradation and to impart desirable properties to the end product.

One such useful multicomponent stabilizer system has been described in U.S. Pat. 3,558,537 which provides polyvinyl chloride resin compositions characterized by having good stability and improved resistance to fogging. The stabilizer/antifogging system of this patent is comprised of a zinc salt of a monocarboxylic fatty acid with partial esters derived from polyglycerols and unsaturated fatty acids. One or more other additives or modifiers such as epoxy plasticizers and phosphite stabilizers may also be included in the package.

While the compositions described in the 3,558,537 patent are highly effective stabilizers there are several problems associated with the use of these materials. First, the stabilizer compositions are pasty masses which do not readily flow at ambient conditions and are often lumpy and heterogeneous. This problem, while not insurmountable, makes handling and processing difficult. If the stabilizer is not uniformly dispersed in the resin its effectiveness is reduced. A second drawback to the use of the pastes prepared in accordance with the 3,558,537 patent is that the materials undergo phase separation if they are permitted to stand for lengths of time as might be encountered during shipping and storage.

It would be highly useful and advantageous if highly effective liquid stabilizer packages were available which, in addition to stabilizing the resins, also imparted antifogging and antistatic properties to polyvinyl chloride. Such a stabilizer composition would not undergo phase separation upon standing and could be handled easily and incorporated into polyvinyl chloride resins with the result that homogeneous blends, uniform from batch to batch, would be obtained.

SUMMARY OF THE INVENTION

We have now quite unexpectedly discovered liquid stabilizer systems comprised of Group II metal halides and polyglycerol partial esters.. These liquid stabilizers are highly effective in the prevention of oxidative, thermal and photochemical degradation of vinyl halide resins and additionally impart antifogging and antistatic properties to the compounded resins. This discoverey is particularly surprising when it is considered that Group II -metal halides have heretofore generally been though to be detrimental to vinyl halide resins. Metal halides incorporated in vinyl halide resins such as polyvinyl chloride have been reported to enhance the degradation of the polymer by catalyzing the evolution of HCl. Furthermore, it is unexpected that the metal halides will serve a useful function like the metal carboxylates of U.S. Pat. 2,711,401 since they are incapable of acting as scavengers for HCl, which many believe is essential if a material is to be an effective stabilizer for vinyl halide resins.

The liquid stabilizers of this invention are comprised of a Group II-B metal halide in combination with a polyglycerool partial ester of a monocarboxylic acid. The liquid stabilizers are solutions, achieved by first dissolving the metal halide in a small amount of water and then mixing with the partial ester, which do not undergo phase separation when allowed to stand at ambient conditions for prolonged periods. Preferred compositions consist of zince chloride or zinc chloride in combination with one or more other metal chlorides with a polyglycerol partial ester derived from a polyglycerol containing from 2 to 10 condensed glycerol units and an aliphatic or aromatic monocarboxylic acid containing from about 6 to 24 carbon atoms. The polyglycerol partial esters will have no more than 75%, and preferably less than about 50%, of the hydroxyl groups reacted to the ester. The metal halide to polyglycerol partial ester ratio is such that the metal content in the liquid stabilizer is between about 0.1 and about 10% by weight. The stabilizers are used in amounts so that between about 0.01% and 2% of the metal is present in the compounded resin which is preferably a vinyl chloride homopolymer or copolymer. In another embodiment of this invention an organophosphorous compound is included in the liquid stabilizer in an amount up to about 25% by weight.

DETAILED DESCRIPTION

This invention is directed to liquid stabilizers comprised of Group II metal halides and polyglycerol partial esters. These stabilizers are useful with vinyl halide resins, such as polyvinyl chloride homopolymers and copolymers, and in addition to stabilizing the resins against oxidative, thermal and photochemical degradation also impart antifogging and antistatic properties to the resin.

The metal halide component employed in the present stabilizers are Group II metal halides. The halide moiety may be bromide or chloride, however, best results are obtained when Group II metal chlorides are used. Group II metals useful for the present invention include Group II-A and Group II-B metals such as magnesium, calcium, strontium, barium, zinc, cadmium and mixtures thereof. Certain stabilizer systems of this invention prepared with zinc, calcium and magnesium chlorides or mixtures thereof are particularly useful since they may be used in food packaging film applications or similar usages where non-toxic properties are required. Zinc chloride is a preferred metal halide for use with the polyglycerol partial esters in the present invention and may be advantageously employed by itself or with other metal halides such as magnesium, calcium and barium chlorides.

The polyglycerol partial esters used in combination with the metal chlorides to prepare the liquid stabilizers of this invention are obtained by the partial esterification of polyglycerols with a monocarboxylic acid. Polyglycerols used to obtain the partial esters are intermolecular glycerol ethers formed by the condensation of two or more glycerol molecules accompanied by the elimination of water. Such reactions are known to the art. The number of molecules condensed and molecular weight distribution of the resulting polyglycerol product is primarily a function of reaction time. Reaction rates are governed by the temperature at which the reaction is conducted. Polyglycerols obtained are generally mixtures of products containing from two up to as many as thirty condensed glycerol units and unreacted glycerine. It is to be understood for the purposes of this invention that when a specific polyglycerol is mentioned, this is not to be construed as indicative of a pure polyglycerol but only that this is the major polyglycerol component in the mixture. Suitable polyglycerols for the preparation of the partial esters useful in the present invention include, for example, diglycerol, triglycerol, tetraglycerol, pentaglycerol, hexaglycerol, heptaglycerol, octaglycerol, nonaglycerol, decaglycerol, pentadecaglycerol, tricontaglycerol and the like. Preferably, the polycerol partial esters are derived from polyglycerols containing 2 to 10 condensed glycerol units. The desired physical characteristics of the partial ester and its ultimate usage will dictate polyglycerol or polyglycerol mixture will be employed. Other polyether polyols such as the condensation products of sorbitol, mannitol, pentaerylthritol, trimethylolpropane or mixtures thereof, may also be partially esterified and used in this invention.

One or more carboxylic acids, preferably aromatic or aliphatic, containing from about 6 to about 24 carbon atoms is esterified with the polyglycerol. Known esterification techniques, catalysts and reaction conditions are employed. An esterification catalyst may be used but is not essential. The reaction may be monitored by measuring the amount of water formed or by measuring the acid value or hydroxyl value of the reaction product. The reaction is carried out so that the polyglycerol will not be completely esterified, that is, not all of the hydroxyl groups will be reacted. For this invention not more than 75%, and preferably less than about 50%, of the polyglycerol hydroxyl groups should be reacted to the ester. The degree of esterification will be varied according to the reactants employed and the properties desired in the polyglycerol ester product. The position of the ester groups on the polyglycerol may vary, however, since the polyglycerols contain both primary and secondary hydroxyl groups, there will be a certain amount of selectivity as to the position of the ester groups. Primary hydroxyl functions being more reactive than the secondary hydroxyl groups will preferentially react with the acid giving terminal ester groups, however, in all cases (even when only enough acid is present to react with two hydroxyl groups) mixtures will result since it is impossible to completely eliminate competing reactions. As the equivalents of acid are increased the number of ester groups pendant to the polyglycerol chain as a result of reaction with secondary hydroxyl groups will necessarily increase.

The monocarboxylic acids used to prepare the partial esters are aliphatic and aromatic monocarboxylic acids containing about 6 to 24 carbon atoms and having the general formula R—COOH where R is an alkyl, aryl, alkaryl or aralkyl radical. Fatty acids which are liquids at about room temperature and contain from about eight to eighteen carbon atoms are especially useful. They may be saturated or contain unsaturation. Typical acids useful in the preparation of the partial esters include octanoic acid, 2-ethylhexanoic acid, capric acid, lauric acid, myristic acid, palmitic acid, isostearic acid, oleic acid, stearic acid, eleostearic acid, palmitoleic acid, linoleic acid, linolenic acid, ricinoleic acid, benzoic acid, toluic acid, phenylacetic acid, hydrocinnamic acid, α-phenyl butyric acid, and the like. Mixtures of these and related acids may be employed and are sometimes desirable. Such mixtures may contain both saturated and unsaturated acids as are obtained from natural products such as vegetable and animal fats and oils. Coconut oil, cottonseed oil, linseed oil, olive oil, soybean oil, tallow, lard, tall oil, peanut oil and tung oil are typical sources used to provide mixed acids suitable for esterification with the polyglycerol. When solely saturated acids are to be esterified with the polyglycerol a source which provides saturated acids may be employed or a mixture of unsaturated and saturated acids obtained from any source may be hydrogenated prior to esterification.

The liquid stabilizers of this invention are prepared by mixing the polyglycerol partial ester and an aqueous solution containing the metal halide. As a general rule, as little water as possible will be used in preparing the liquid stabilizers in order to maximize the compatibility of the metal halide and polyglycerol partial ester. The aqueous solution contains from about 40 to 90% by weight of the metal halide. To facilitate solution of the metal halide heating the solution to increase the solubility of the metal halides may be desirable, however, before combining with the polyglycerol partial ester the solution should be allowed to cool to room temperature. Using this technique clear liquid stabilizer systems result. The metal halide solution and polyglycerol partial ester require no special mixing and are readily compatible. The ratio of metal halide to polyglycerol partial ester may be varied so that the metal content of the stabilizer system ranges between about 0.1 to about 10% by weight and, more preferably, from about 0.5 to about 5% by weight. To achieve effective stabilization an amount of stabilizer calculated so that the vinyl halide resin contains about 0.01% to 2% metal and, more preferably, from about 0.05 to about 0.5% metal is employed.

While the liquid stabilizers containing only the metal halide and polyglycerol partial ester impart antistatic and antifogging properties to the resin and are highly effective to inhibit the oxidative, thermal and photochemical degradation in resins, it may, nevertheless, be desirable to incorporate one or more other additives in the liquid stabilizer package. Additional advantages may be realized by the incorporation of suitable additives with the metal halide and polyglycerol partial ester. A particularly useful liquid stabilizer system is obtained when an organophosphorous compound is included therewith. The additional ingredients may be added to the liquid stabilizer composition containing the metal halide polyglycerol partial ester at room temperature.

Organophosphorous stabilizers which may be advantageously incorporated in the liquid stabilizer systems of this invention are the phosphites which contain at least one —OR group bonded to a phorphorous atom wherein R is a hydrocarbon radical such as aryl, alkyl, alkaryl, aralkyl or cycloaliphatic or heterocyclic group. R groups will generally contain from about 1 to about 24 carbon atoms and, more preferably, from about 6 to about 20 carbon atoms. Phosphites useful in combination with the metal halide and polyglycerol partial esters of this invention may be represented by the general formula

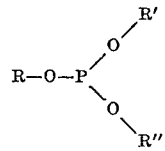

wherein R is one of the above defined groups and R' and R'' are hydrogen or a radical as defined above for R. The R groups may be the same or they may be different. Phosphite stabilizer compounds of the above type include monophenyl phosphite, diphenyl phosphite, triphenyl phosphite, tricresyl phosphite, tri(octylphenyl) phosphite, tri(nonylphenyl) phosphite, tri(p-tert-nonylphenyl) phosphite, tribenzyl phosphite, tri(2-cyclohexyl) phosphite, tricyclopentyl phosphite, tri(tetrahydrofurfuryl) phosphite, monoisooctyl phosphite, diisooctyl phosphite, triisooctyl phosphite, tridodecyl phosphite, diisooctyl phenyl phosphite, diphenyl decyl phosphite, issooctyl diphenyl phosphite, tri(2-ethylhexyl) phosphite and the like. Also useful are phosphite compounds wherein R' and R'' join to form ring systems as illustrated in the formulae

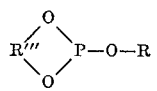

and

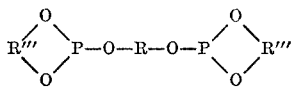

wherein R''' is a bivalent hydrocarbon radical and R is a monovalent radical, as previously defined, or a divalent radical derived therefrom. Triphosphites, that is, where R, R; and R" are all hydrocarbon radicals, either the same or different, are a preferred embodiment of the instant invention. Tri(alkaryl) phosphites are preferred with tri(nonylphenyl) phosphite being especially useful since this phosphite has been approved in polyvinyl chloride resin films for food packaging applications.

In addition to the organophosphorous stabilizer still other additives may be incorporated therein. For example, supplemental stabilizers may be added where the end use of the vinyl halide resin requires such additional stabilization. For most film applications, however, liquid stabilizer compositions consisting of a metal halide, a polyglycerol partial ester and an organophosphorous compound adequately stabilize the vinyl halide resin against the deleterious effects of oxygen, heat and light. The organophosphorous compounds, if used with the metal halide and partial ester, may constitute up to as much as 25% by weight of the liquid stabilizer. If other additives are included in the stabilizer package they will generally not exceed about 10% by weight of the liquid stabilizer composition. Such supplemental stabilizers might include light stabilizers derived from benzophenone and its derivatives, such as 2,2'-dihydroxybenzophenone and 2-hydroxybenzophenone, or stabilizers such as those derived from benzotriazoles, triazines and phenylsalicylates may be useful. Phenolic type antioxidants, such as the hindered phenols containing one or two alkyl groups, preferably tertiary alkyl groups immediately adjacent to the hydroxyl group on the aromatic nucleus, may also be used. Compounds of this type include phenol, resorcinol, catechol, cresol, 2,6-di-t-butyl phenyl, 2,6-di-t-butyl-p-cresol, 2,2-bis-(4-hydroxyphenyl) propane, methylene - bis(2,6-di-t-butyl phenol), methylene-bis(p-cresol) and the like. Polyvalent metal salts of substituted phenols such as polyvalent metal phenolates are also effective stabilizers and may be advantageously employed with this invention. Supplemental antistatic protection may be obtained by the addition of one or more antistatic agents such as esters of fatty acids, mono- or polyhydric alcohols, polyoxyethylene derivatives and the like. Still other additives such as epoxy compounds may be included in the liquid stabilizer package.

The present liquid stabilizer systems are useful with a wide variety of vinyl halide resins, however, their primary utility is with polyvinyl chloride homopolymers and copolymers. They may generally be used with vinyl polymers derived from one or more vinyl monomers, that is, containing a CH=C< group, including: vinyl chloride; vinyl bromide; vinyl acetate: vinylidene chloride; lower allyl esters; vinyl alkyl ethers; acrylic and methacrylic esters such as ethyl acrylate, methyl acrylate, methyl metacrylate; acrylic acid and methacrylic acid; acrylonitrile and methacrylonitrile; and the like. Copolymer compositions obtained by the copolymerization of vinyl chloride with vinyl acetate, vinyl chloride with vinyl butyrate, vinyl chloride with vinyl propionate, vinyl chloride with vinylidene chloride, vinyl chloride with methyl acrylate, vinyl chloride with 2-ethylhexyl acrylate and vinyl chloride with two or more monomers such as mixtures of vinylidene chloride and 2-ethylhexyl acrylate may also be effectively stabilized with these liquid stabilizer systems. Additionally, the present liquid stabilizer compositions are useful with butadiene-styrene copolymers, butadiene-acrylonitrile copolymers, acrylonitrile-butadiene - styrene terpolymers, chloroprene polymers, polystyrene, polyacetals and the like. They may also be used with blends of one or more of the above polymer compositions. Ex-cellent results are obtained and the liquid stabilizers are especially effective with polyvinyl chloride homopolymer and polyvinyl chloride copolymers wherein the vinyl chloride comprises at least 80% of the polymer composition.

The stabilizers of this invention, being liquids, are readily incorporated into the vinyl halide resins. The usual mixing techniques are employed and no special processing is required to incorporate the liquid stabilizers into the resins. The solutions may be used immediately after preparation or, since the liquids do not separate upon standing, they may be stored and used as required without prior mixing. The stabilizers may be incorporated in the resins by kneading, milling and mixing with a Banbury or ribbon mixer. They may be added as such, a masterbatch prepared, or they may be emulsified and the emulsion added to the resin. The liquid stabilizers may be used in conjunction with other known compounding ingredients including: plasticizing agents such as dioctyl phthalate, diisooctyl phthalate, dioctyl adipate, trioctyl phosphate and various polymeric and epoxy plasticizers; antioxidants such as amines and phenols; pigments and other colorants; fillers; lubricants; antisticking agents; processing and extrusion acids; curing agents; and the like. The liquid stabilizer and any additional compounding ingredients may be prepared as a masterbatch and added to the resin as a whole or the liquid stabilizer and additional ingredients may be mixed into the resin separately.

The liquid stabilizers are compatible with epoxy plasticizers commonly employed with vinyl chloride homopolymers and copolymers. The epoxy plasticizer may be included in with the liquid stabilizer composition, however, since the epoxy plasticizers often comprise as much as 50% or more of the compounded resin they will generally be added to the resin separately. Useful epoxy plasticizer compounds contain one or more epoxy groups per molecule and may be aliphatic, cycloaliphatic, aromatic or heterocyclic in nature. Preferably, aliphatic or cycloaliphatic epoxy compounds containing from about 10 to 180 carbon atoms and, more preferably, from 20 to 150 carbon atoms, are employed. Such esters are derived from unsaturated alcohols and/or unsaturated acids wherein the ester is subsequently epoxidized at the site of the unsaturation. Alternatively, the unsaturated acid or alcohol may be epoxidized prior to the esterification reaction. Typical unsaturated acids for this purpose are oleic, linoleic, linolenic, erucic and ricinoleic acids. These may be esterified with monohydric or polyhydric alcohols or mixtures thereof. Useful monohydric alcohols are butanol, 2-ethylhexanol, octanol, isooctanol, lauryl alcohol, stearyl alcohol, oleyl alcohol and the like. Polyhydric alcohols may incude pentaerythritol, ethylene glycol 1,2-propylene glycol, 1,4-butylene glycol, neopentyl glycol, glycerol, mannitol, sorbitol, ricinoleyl alcohol and the like. The polyhydric alcohols may be fully or partially esterified.

Especially useful epoxy plasticizers are the epoxidized naturally occurring oils which are mixtures of epoxidized higher fatty acid esters. Suitable oils include epoxidized soybean oil, epoxidized olive oil, epoxidized cottonseed oil, epoxidized coconut oil, epoxidized tall oil fatty acid esters, epoxidized tallow and the like. Epoxidized soybean oil is especially useful with the liquid stabilizers of this invention. The epoxidized oils may be obtained using known epoxidation methods, such as the formic acid and sulfuric acid processes, and by employing any of the known epoxidizing agents.

Other epoxy compounds not as effective as the aforementioned plasticizers but desirable in small amounts for their stabilizing properties may also be included. Typical epoxy compounds of this type are epoxidized monocarboxylic acids, glycidyl ethers of polyhydric alcohols and phenols, epoxy polyethers of polyhydric phenols and the like. These epoxy stabilizers will generally not exceed about 10% by weight of the total epoxy compound.

The following examples illustrate the invention more fully, however, they are not intended as a limitation on the scope thereof. In the examples all parts and percentages are given on a weight basis unless otherwise indicated.

Example I

A polyglycerol partial ester was prepared as follows: 1980 grams of a polyglycerol having a hydroxyl value of about 1280 (an average of 2.3 condensed golycerol units), 1287 grams mixed $C_{8-10}$ normal fatty acids and 1155 grams oleic acid were combined in a flask. The reaction mixture was heated at a maximum temperature of about 235° C. with stirring and the reaction continued until the acid value of the reaction mixture was substantially nil. The resulting polygylcerol partial ester having about 30% of the hydroxy groups of the polyglycerol reacted was cooled and stored for subsequent use. No catalyst was employed in this esterification reaction, however, similar esterification were conducted using hypophosphorous acid.

Example II

Following a procedure similar to that described in Example I, 1920 grams of the polyglycerol and 2496 grams of the mixed fatty acids were reacted at 240° C. in the presence of 8 grams of a 30% solution of hypophosphorous acid. The resulting ester contained about 55% unreacted hydroxyl groups.

Example III

A polyglycol partial ester of benzoic acid was prepared by reacting 645 grams of the polyglycerol and 655 grams benzoic acid. No catalyst was employed, however, a vacuum was pulled on the system. The partial ester prepared in this manner had about 35% of the hydroxyl groups reacted.

Example IV

A liquid stabilizer was prepared by dissolving 2.75 parts anhydrous zinc chloride in 2.75 parts water. When the zinc chloride had dissolved and the solution cooled to room temperature 94.5 parts of the polyglycerol partial ester of Example II was added thereto with stirring. The resulting clear light amber liquid was used to stabilize polyvinyl chloride resin. The formulation used to obtain a semi-rigid composition was as follows:

| | Parts |
|---|---|
| Polyvinyl chloride homopolymer (Diamond Shamrock 40) | 100.0 |
| Impact modifier (Blendex 401) | 17.0 |
| Epoxidized soybean oil (6.8–7.0 oxirane value) | 15.0 |
| Stearic acid | 0.5 |
| Liquid stabilizer | 2.0 |

The ingredients were blended and milled at 350° F. for about 5 minutes. Water-white films suitable for vacuum forming and having excellent heat stability and antifogging and antistatic properties were obtained.

To demonstrate the heat stability of the stabilized resins, 1" x 1" squares were cut from 35 mil sheet and the samples placed in eight glass trays which were fitted in a rotating device in an electric oven maintained at 375° F. The heating was conducted for 80 minutes and a single sample removed at ten-minute intervals. After cooling the test specimens were observed for discoloration and other signs of polymer degradation. Samples stabilized in accordance with the present invention withstood the entire 80-minute heating without failure, that is, without degradation and severe discoloration and charring. After 80 minutes the samples were clear with only slight coloration (light amber).

A 3-mil sheet was prepared and used to evaluate the antifogging properties by stretching the film over a 250 ml. beaker ⅔ full of water heated at 80° C. This is a common test employed to measure resistance of films to fogging. Films compounded in accordance with the above recipe showed no fogging (condensation of water droplets on the film) initially or even after 10 minutes standing over the water.

Antistatic properties of the stabilized polyvinyl chloride films were demonstrated by rubbing the film with a wool cloth a specified number of strokes in one direction, stretching the charged film about 1" over an ashtray containing cigar or cigarette ash and observing the amount of ash pick-up. Polyvinyl chloride films compounded in accordance with the present receipe had negligible ash pick-up.

The liquid stabilizer prepared with the zinc chloride and the polyglycerol partial ester of Example II was allowed to shelf-age for 18 months at room temperature and there was no evidence of separation or any noticeable color change in the solution. When the aged liquid stabilizer was incorporated in polyvinyl chloride homopolymer in accordance with the above recipe composition there was no decrease in the effectiveness of the liquid stabilizer as evidenced by identical results being obtained in the 375° F. oven stability test.

Similar results are obtained when the liquid stabilizers are derived from polyglycerol partial esters containing between three and four condensed glycerol molecules in the polyglycerol portion esterified with mixer $C_8$–$C_{10}$ normal fatty acids.

Examples V–X

A series of liquid stabilizers were prepared from zinc chloride with polyglycerol partial esters. The different partial esters were obtained by reacting various acids with a polyglycerol containing 2.3 condensed glycerol units in a molar ratio of 1.5:1, respectively. Liquid stabilizers were then prepared as described in Example IV in accordance with the following recipe:

| | Parts |
|---|---|
| Zinc chloride (anhydrous) | 3.0 |
| Distilled water | 3.0 |
| Polyglycerol partial ester | 94.0 |

These liquid stabilizers were used in a vinyl chloride resin formulation suitable for the preparation of food packaging films. The resin formulation was as follows:

| | Parts |
|---|---|
| Polyvinyl chloride homopolymer (Diamond Shamrock 450) | 100.0 |
| Dioctyl adipate | 18.0 |
| Epoxidized soybean oil | 9.0 |
| Stearic acid | 0.5 |
| Liquid stabilizer | 2.0 |

The resulting vinyl chloride resins were evaluated for heat stability in accordance with the previously described procedures and the results obtained are set forth in the following table. The acid used for the preparation of the polyglycerol partial ester in each example is also reported in the table. The percent heat stability extension was obtained by observing the improvement of the samples stabilized in accordance with the present invention over an identical resin containing only zinc chloride without the polyglycerol partal ester and is also reported.

| Acid | Time to failure, minutes | Heat stability extension (percent) |
|---|---|---|
| Example: | | |
| V........ Caprylic | 50 | 100 |
| VI....... Mixed $C_8$–$C_{10}$ normal acids | 50 | 100 |
| VII...... Oleic | 40 | 75+ |
| VIII..... Pelargonic | 50 | 100 |
| IX....... 2-ethylhexanoic | 50 | 100+ |
| X........ Neodecanoic | 40 | 50+ |

Example XI

An aqueous solution comprised of 3 parts zinc chloride dissolved in 3 parts distilled water was mixed with 94 parts of a polyglycerol partial ester of benzoic acid prepared in the manner of Example II. Two parts of the resulting liquid stabilizer was employed in the resin formulation of Example V with the result that films having excellent antifogging and antistatic properties and superior resistance to the thermal degradation were obtained. The liquid stabilizers remained clear after ninety days aging at room temperature and their stabilizer efficiency was not diminished.

Example XII

Two liquid stabilizer compositions were prepared as follows:

Liquid stabilizer A:

| | Parts |
|---|---|
| Zinc chloride (anhydrous) | 2.0 |
| Calcium chloride (anhydrous | 5.0 |
| Distilled water | 4.0 |
| Polyglycerol partial ester of Example II | 89.0 |

Liquid stabilizer B:

| | Parts |
|---|---|
| Zinc chloride (anhydrous) | 2.0 |
| Magnesium chloride (anhydrous) | 6.0 |
| Distilled water | 4.0 |
| Polyglycerol partial ester of Example II | 88.0 |

These liquid stabilizers were evaluated in a vinyl halide resin formulation suitable for pond liners and potable water containers having the following composition:

| | Parts |
|---|---|
| Polyvinyl chloride copolymer (Union Carbide VYNW) | 100.0 |
| Dioctyl phthalate | 54.0 |
| Epoxidized soybean oil | 5.0 |
| Stearic acid | 0.5 |
| Calcium carbonate | 10.0 |
| Titanium dioxide | 10.0 |
| Liquid stabilizer | 2.0 |

The white opaque sheeet obtained were smooth and had good flexibility. These resins had excellent heat stability as evidenced by the fact that even after 80 minutes oven-aging at 375° F. they had not yet blackened but only had a light tan color.

Example XIII

A liquid stabilizer was prepared in accordance with the following formulation:

| | Parts |
|---|---|
| Water | 5.0 |
| Zinc chloride (anhydrous) | 2.1 |
| Calcium chloride (anhydrous) | 5.6 |
| Diphenyl decyl phosphite | 54.4 |
| Butylated hydroxytoluene | 2.9 |
| Polyglycerol partial ester of Example II | 30.9 |

The liquid stabilizers were prepared by mixing diphenyl decyl phosphite and butylated hydroxytoluene with the partial ester before combining with the cooled aqueous metal halide solution. The liquid stabilizer was evaluated at a two-part level in a resin formulation containing 100 parts Diamond Shamrock 450 vinyl chloride homopolymer, 50 parts dioctyl phthalate, 10 parts epoxidized soybean oil, and 0.5 part mineral oil. The compounded resin had excellent antistatic and antifogging properties in addition to having a high degree of heat stability—only slight discoloration (light yellow) after 80 minutes at 375° F. The resins had a markedly reduced tendency to blush compared to an identical formulation stabilized with a conventional barium/ cadmium phenate-carboxylate liquid stabilizer. Blushing, or water-whitening as it is sometimes called, is the development of cloudiness in the resin upon exposure to water, especially hot water. This is an undesirable feature with many vinyl halide resins, particularly where a sanitary appearance of the product should be maintained, such as in tubing used in hospitals or to transport food products such as milk. The cloudiness makes it appear that the tubing is dirty when, in fact, it is not. The minimization of blushing in stabilized vinyl chloride resins is a highly desirable feature obtainable by the use of liquid stabilizer formulations within the scope of this invention. By varying the polyglycerol and the ratio of ester to hydroxyl groups present in the polyglycerol partial ester it is possible to vary the hydrophilic properties of the liquid stabilizer and of vinyl halide resins stabilized therewith.

We claim:
1. A liquid stabilizer for vinyl halide resins comprising:
   (a) a Group II metal halide,
   (b) sufficient water to dissolve said metal halide, and
   (c) a polyglycerol partial ester of a monocarboxylic acid containing 6 to 24 carbon atoms; said metal halide and polyglycerol partial ester present in amounts so that the metal content in the liquid stabilizer is between about 0.1 and 10% by weight.

2. The liquid stabilizer of claim 1 wherein an aqueous solution of the Group II metal halide containing from about 40 to 90% by weight metal halide is prepared prior to the addition of the polyglycerol partial ester.

3. The liquid stabilizer of claim 2 wherein the metal halide and polyglycerol partial ester are present in amounts so that the metal content in the liquid stabilizer is between about 0.5 and 5% by weight.

4. The liquid stabilizer of claim 3 wherein the metal halide is selected from the group consisting of zinc chloride, calcium chloride and magnesium chloride and the polyglycerol partial ester is derived from polyglycerols containing 2 to 10 condensed glycerol units and a fatty acid containing 8 to 18 carbon atoms, said polyglycerol having less than about 50% of the hydroxyl groups reacted.

5. The liquid stabilizer of claim 1 wherein the Group II metal halide is a chloride of magnesium, calcium, strontium, barium, zinc or cadmium and the polyglycerol partial ester is derived from polyglycerols containing 2 to 10 condensed glycerol units and an acid of the general formula R—COOH where R is an alkyl, aryl, alkaryl or an aralkyl radical, said polyglycerol having not more than 75% of the hydroxyl groups reacted.

6. The liquid stabilizer of claim 5 wherein the metal halide is selected from the group consisting of zinc chloride, magnesium chloride and calcium chloride and the polyglycerol has less than about 50% of the hydroxyl groups esterified with a fatty acid containing from about 8 to 18 carbon atoms.

7. The liquid stabilizer of claim 6 which additionally contains an organophosphorous compound of the formula

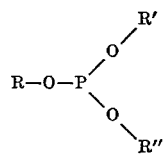

wherein R is a radical containing from about 1 to 24 carbon atoms selected from the group consisting of aryl, alkyl, alkaryl, aralkyl, cycloaliphatic and heterocyclic and R' and R" are hydrogen or a radical as defined for R.

8. The liquid stabilizer of claim 7 wherein the organophosphorous compound is a triphosphite having R groups containing from 6 to 20 carbon atoms and constituting up to about 25% by weight of the liquid stabilizer, with the metal halide and polyglycerol partial ester present in amounts so that the metal content is between about 0.5 and 5% by weight.

9. A vinyl halide polymer resin containing the liquid stabilizer of claim 1 so that about 0.01% to 2% of the metal is present in the resin.

10. The resin composition of claim 9 wherein the vinyl halide polymer is a polyvinyl chloride homopolymer or copolymer.

11. The resin composition of claim 10 containing the liquid stabilizer of claim 7 in an amount so that 0.05% to 0.5% of the metal is present in the resin.

References Cited

UNITED STATES PATENTS

| 2,717,842 | 9/1955 | Vitalis | 260—Digest 16 |
| 3,479,308 | 11/1969 | Gattenky et al. | 260—23 |
| 3,542,713 | 11/1970 | Gillio-Tos | 260—23 |
| 3,627,718 | 12/1971 | Siefert | 260—92.8 |
| 3,558,537 | 1/1971 | Hecker et al. | 260—23 |
| 3,681,275 | 8/1972 | Takeya et al. | 260—23 |

DONALD E. CZAJA, Primary Examiner

V. P. HOKE, Assistant Examiner

U.S. Cl. X.R.

252—400; 260—45.7 R, 45.75 R, 45.85 R